United States Patent [19]

Nara et al.

[11] Patent Number: 4,846,309

[45] Date of Patent: Jul. 11, 1989

[54] ELEVATOR HOISTING APPARATUS

[75] Inventors: Toshihiko Nara, Katsuta; Tastuhiko Takahashi, Ibaraki; Masakatsu Tanaka, Katsuta; Yusho Maue, Ibaraki; Naoyuki Tanaka, Abiko; Masaaki Isono; Yozo Nakamura, both of Ibaraki, all of Japan

[73] Assignee: Hitachi, Ltd., Tokyo, Japan

[21] Appl. No.: 26,619

[22] Filed: Mar. 17, 1987

[30] Foreign Application Priority Data

Mar. 17, 1986 [JP] Japan .................................. 61-56822
Sep. 2, 1986 [JP] Japan .................................. 61-206198

[51] Int. Cl.⁴ ............................................ B66B 11/04
[52] U.S. Cl. .................................... 187/20; 74/413
[58] Field of Search ............... 187/20, 27, 17; 74/413, 74/421 R, 665 F, 670, 412 R; 254/362

[56] References Cited

U.S. PATENT DOCUMENTS

| | | | |
|---|---|---|---|
| 3,641,832 | 2/1972 | Shigeta et al. | 187/20 |
| 4,422,531 | 12/1983 | Ohtomi et al. | 187/20 |
| 4,433,755 | 2/1984 | Ohtomi | 187/20 |
| 4,526,252 | 7/1985 | Hirano | 187/20 |

FOREIGN PATENT DOCUMENTS

| | | | |
|---|---|---|---|
| 1456445 | 5/1969 | Fed. Rep. of Germany | 74/413 |
| 1481701 | 7/1969 | Fed. Rep. of Germany | 187/20 |
| 477641 | 1/1938 | United Kingdom . | |
| 982745 | 2/1965 | United Kingdom . | |
| 1297486 | 12/1976 | United Kingdom . | |

Primary Examiner—Joseph J. Rolla
Assistant Examiner—Kenneth Noland
Attorney, Agent, or Firm—Antonelli, Terry & Wands

[57] ABSTRACT

This invention discloses a hoisting apparatus for use with an elevator system including a reduction gear assembly connected to a driving electric motor and a sheave. A main rope is reeved around the sheave and a car is suspended from the rope for vertical movement. The reduction gear assembly includes a pair of large and small gears. The small and large gears are connected respectively to the input and output shafts of the reduction gear assembly and the input and output shafts are disposed in face-to-face relationship. The electric motor are connected to the input shaft while the sheave and a brake system is connected to the output shaft. One bearing of the sheave is integral with a gearbox of the reduction gear assembly, and the large gear is supported in an overhanging manner by the shaft of the sheave. This arrangement enables silent and safe operation of elevator cars.

6 Claims, 7 Drawing Sheets

DISTANCE ($l$) OF TRAVEL OF THE CONTACT POINT ALONG THE LINE OF ACTION OF THE TEETH

4,846,309

ELEVATOR HOISTING APPARATUS

BACKGROUND OF THE INVENTION

The present invention relates to an elevator hoisting apparatus, and more particularly to an elevator hoisting apparatus utilizing a parallel shaft type gear arrangement exhibiting superior low-noise and low-vibration characteristics.

In the field of elevator hoisting apparatus for driving an elevator car or cars, it is known that a parallel shaft type gear arrangement is used as a reduction gear assembly, for example, as disclosed in Japanese Patent Unexamined Publication No. 86586/1984.

FIGS. 5 and 6 schematically show the structure of the prior-art elevator hoisting apparatus set forth in the aforesaid publication.

The illustrated elevator hoisting apparatus includes a hoistway 1 for an elevator or elevators, a machine room 2 provided at the top of the hoistway 1, a floor 2A of the machine room 2, support frames 3A and 3B secured to the floor 2A, a machine platform 4 fixed to the respective of tops of the support frames 3A and 3B, a base 5 supported on the machine platform 4 with a rubber vibration insulator 6 interposed therebetween, an electric motor 7 mounted on the base 5, a reduction gear assembly 8 mounted on the same base 5, an input shaft 8A extending from the shaft of the electric motor 7 and a first gear 8B constituted by a helical gear fixed to the input shaft 8A, the first gear 8A being engaged with a second gear 8D fixed to an output shaft 8F.

The above elevator hoisting apparatus further includes a driving sheave 9 fixed to the output shaft 8F, a deflector-pulley support beam 10 fixed to the machine platform 4, a shaft 11 supported at its opposite ends by the deflector pulley support beam 10, a deflector pulley 12 rotatably fitted onto the shaft 11 and a main rope 13 reeved over the sheave 9 and the deflector pulley 12, one end of the main rope 13 being connected to an elevator car or cars 17 with the other end being connected to a counterweight 18. Although not particularly shown, a brake system serving to bring the car to a stop is provided at the input shaft 8A extending from the electric motor 7 into the reduction gear 8.

In the above-described elevator hoisting apparatus of the prior art, however, the brake device for bringing the car to a stop is provided at the shaft of the electric motor 7. Therefore, in the case of a high-speed elevator system, impact produced upon emergency stop greatly acts on the gear assembly together with the inertial force of the sheave 9. In consequence, an excessive load is applied to the respective gears and this lowers the safety of the entire elevator system.

Also, the sheave 9 and the second gear 8D are fixed to the output shaft 8F with the opposite ends thereof being supported by bearings 8G. However, since a long bearing interval exists between the opposite bearings, the thus-produced deflection of the output shaft 8F affects the state of engagement of the gear assembly, and thus there is a tendency for the level of noise to be increased. In order to prevent the increase in the level of noise, it has heretofore been necessary to increase the substantial diameters of the respective gears to some extent.

In addition, in order to prevent transmission of noise to the periphery of the machine chamber 2 and/or the elevator car, the reduction gear assembly 8 is required to have low-noise characteristics as compared with a reduction gear assembly of a general type. For this reason, a worm gear type of reduction gear assembly has heretofore been chiefly employed. In addition, a helical gear type of reduction gear assembly having a high transmission efficiency has recently started to be used for the sake of saving of energy. However, while such helical gear type reduction gear assembly affords a high transmission efficiency, the state of engagement of helical gears utterly differs from that of the worm gear type. Therefore, as mentioned in Japanese Utility Model Unexamined Publication No. 151371/1982, if the level of noise is to be reduced, it is necessary to prepare a gear with a high precision capable of satisfying the requirements of the first or higher class specified under the Japanese Industrial Standard and this leads to the problem that the production cost is increased. To overcome the problem, the aforesaid publication further states that the helix angle of a helical gear is selected within the angular range of 20 to 30 degrees. This setting of helix angle acts to improve a so-called overlapping contact ratio of gears, thereby reducing the degree of fluctuations in the respective spring constants of the mating gears. In addition, such setting of helix angle acts to suitably adjust the errors of the tooth profiles, pitches and the like of individual teeth by engaging a plurality of teeth.

According to the above-described arrangement, the selection of a helix angle within the range of 20 to 30 degrees serves to reduce the acceleration of the circumferential vibration of the driving sheave 9. However, this circumferential acceleration results chiefly from vibrations as in the direction of rotation of a rotary shaft line connecting the electric motor 7 and the sheave 9. Accordingly, in order to further reduce the level of vibration noise, a high-precision helical gear must finally be used.

SUMMARY OF THE INVENTION

It is therefore an object of the present invention to provide an elevator hoisting apparatus which is reduced in both size and weight with the safety and reliability of elevator systems being ensured and in addition which enables a highly efficient operation with a low level of noise.

To this end, in accordance with the present invention, a reduction gear assembly includes a pair of large and small helical gears, an electric motor and a combination of a sheave and a brake system being disposed on the opposite sides of the reduction gear assembly, and the electric motor being coupled to the input shaft of the reduction gear assembly with the sheave and brake system being coupled to the output shaft of the same. One bearing portion of the sheave is integral with a reduction gearbox, the large gear being supported at one side by the shaft of the sheave, and the sheave being integral with the brake system. In addition to this constructional feature, the present invention succeeds in improving the state of engagement of mating helical gears as in the plane of rotation thereof.

This arrangement enables close layout of the electric motor, the reduction gear assembly and the brake system, thereby achieving a decrease in the size of elevator hoisting systems. Moreover, the brake system is provided at the output shaft of the reduction gear assembly. Therefore, the impact generated by the emergency stop of, for example, a high-speed elevator never acts directly on the respective gears, so that it is possible to improve the safety and reliability of the overall elevator system. Furthermore, the fluctuating load provided by the errors of individual mating gears can be suppressed by reducing the spring constant of their teeth. Also, since the height (or depth) of each tooth is increased, even when there are variations in the number of tooth pairs which are engaged at the same time, abrupt variations in the spring constant of the teeth can be substantially prevented.

The above and other objects, features and advantages of the present invention will become apparent from the following description of the preferred embodiment thereof, taken in conjuction with the accompanying drawings.

BRIEF DESCRIPTION OF THE DRAWINGS

FIGS. 1 to 4 schematically illustrate the construction of a preferred embodiment of an elevator hoisting apparatus in accordance with the present invention, in which;

FIG. 1 is a front elevational view of the preferred embodiment of the present invention;

FIG. 2 is a top plan view, partially in cross-section, of the embodiment shown in FIG. 1;

FIG. 3 is a top plan view of the state of installation of the embodiment shown in FIG. 1;

FIG. 4 is a front elevational view of the embodiment shown in FIG. 3;

FIGS. 5 and 6 schematically illustrate the construction of an example of an elevator hoisting apparatus of the prior art, in which;

FIG. 5 is a longitudinal section of the conventional example including a machine chamber;

FIG. 6 is a top plan view, partially in cross-section, of the conventional example shown in FIG. 5;

DESCRIPTION OF THE PREFERRED EMBODIMENT

Figure 1:
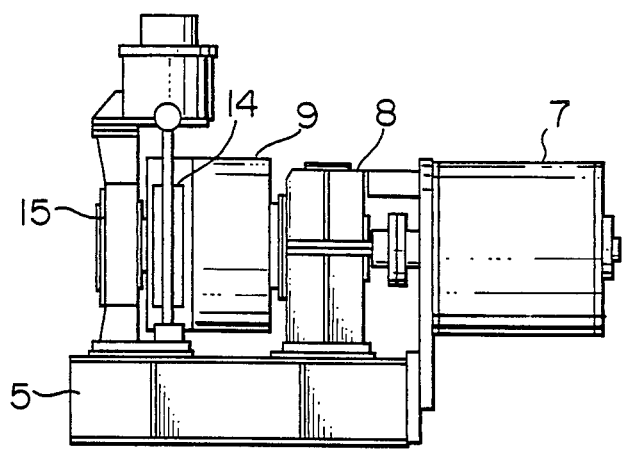
Figure 2:
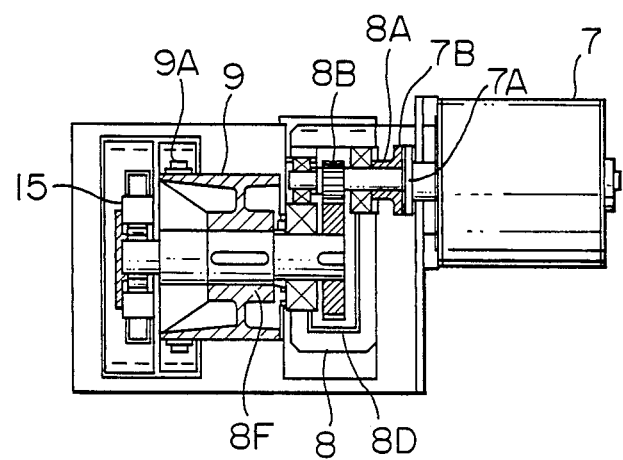

FIGS. 1 and 2 are respectively one preferred embodiment of an elevator hoisting apparatus in accordance with the present invention, FIG. 1 being a front elevational view of the embodiment with FIG. 2 being a top plan view, partially in cross-section of the same. In FIGS. 1 and 2, like reference characters are used for the sake of simplicity to denote like or corresponding elements which constitute each of the components shown in the above-described example of the prior art.

The illustrated embodiment includes the electric motor 7 and the reduction gear assembly 8. The input shaft 8A of the reduction gear assembly 8 is connected to the shaft of the electric motor 7 by couplings 7A and 7B, and the first gear (or small gear) 8B constituted by a helical gear secured to or integral with the input shaft 8A, the input shaft 8A being supported at opposite end portions thereof by the bearings provided at the stationary portion of the reduction gear assembly 8. The second gear (large gear) 8D, the driving sheave 9 and a brake drum 9A are fixed to the output shaft 8F, the second gear 8D being engaged with the first gear 8B and the brake drum 9A being integral with the driving sheave 9. The sheave 9 and the electric motor 7 are disposed on opposite sides of the central reduction gear assembly 8, one end of the output shaft 8F being supported by a bearing 15 with the other end thereof being rotatably supported by the sheave 9 positioned in the vicinity of the reduction gear assembly 8. The second gear 8D is supported in an overhanging manner by the portion of the output shaft 8F which is near the reduction gear assembly 8, the second gear 8D being engaged with the first gear 8B. The electric motor 7, the reduction gear assembly 8 and the bearing 15 are fixed to the common base 5, and also the common base 5 supports a brake element 14 attached to the brake drum 9A by means of the bearing 15.

Referring illustratively to a high-speed elevator in the class of a 240 m/min elevator speed, if a 2:1 roping system in which a pulley is disposed on a car is applied to such an elevator, it is possible to increase the rotational speed of its sheave. If the diameter of the sheave is set to forty times 12 mm which is a rope diameter, that is, 500 mm and also the rotational speed is set to 1500 rpm for the sake of reducing the size of an electric motor, the resultant reduction ratio is 4.9, and this means that, in the case of helical gears, a one-step speed reduction results. Also, in the case of elevator having a speed of less than 240 m/min, if the rotational speed of the electric motor is controlled by inverter control or the like within a lower range in which its economic efficiency is not lowered, a one-step speed reduction is provided. This is more advantageous than a two-step speed reduction from the viewpoints of reduction in size and cost.

By so doing, since the shaft of the electric motor 7 is connected to the input shaft 8A by the couplings 7A and 7B, if the couplings 7A and 7B are, for example, of a flexible type made of rubber, it is possible to absorb the vibration transmitted from the electric motor 7, thereby facilitating an alignment operation.

Also, since the input shaft 8A provided with the first gear 8B is rotatably supported at its opposite ends, the first gear 8B is not affected by the vibration transmitted from the electric motor 7, so that the first gear 8B and the second gear 8D can be engaged with each other in a stable manner.

The output shaft 8F provided with the second gear 8D has a strength (or large diameter) sufficient to bear the loads such as the sheave 9 and the brake drum 9A, the output shaft 8F being secured in the vicinity of the bearing 15 in an overhanging manner. Therefore, the level of fluctuations in engagement is small with respect to variations in the level of load and thus the noise can be maintained at a low level.

Also, since the first gear 8B and the second gear 8D are disposed in horizontal relationship and the casing of the reduction gear assembly 8 is constituted by a pair of upper and lower members, the center distance between the mating gears can be minimized in accordance with the sizes of their bearings, and yet it is easy to adjust tooth contact.

Figure 3:
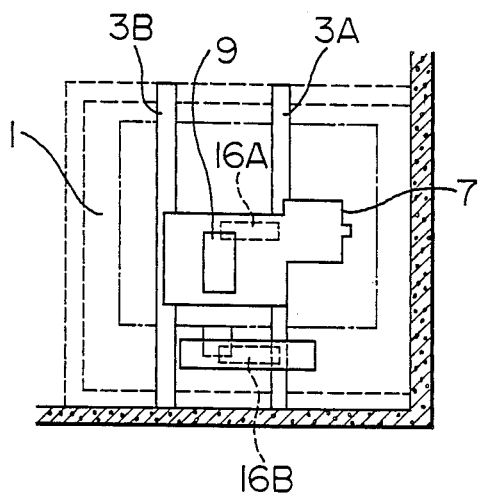

The brake drum 9A is not disposed on the shaft of the electric motor 7, but is integral with the sheave 9 about the output shaft 8F of the reduction gear assembly 8. This arrangement serves to prevent the impact generated upon emergency stop from acting directly on the respective gears. Should any of the gears be broken, the brake system is actuated to bring the sheave to a stop, thereby preventing drop of the car or a counterweight. In addition, the brake system is disposed on the side of the sheave 9, and the dimension between the braking system and the shaft end of the electric motor 7 are substantially equal to that between the same and the end portion of the output shaft 8F (or shaft of the sheave 9). In consequence, as shown in FIG. 3, the elevator hoisting apparatus can be disposed in the substantial center of the hoistway 1 in top plan.

Figure 4:
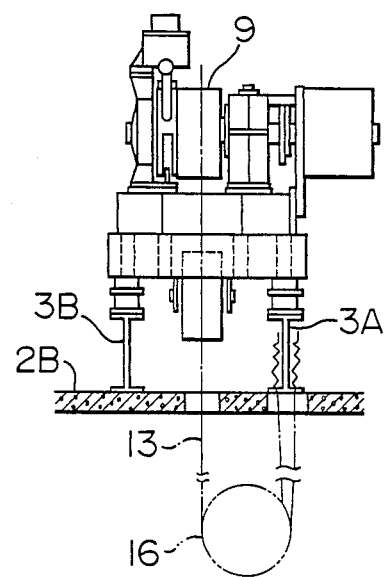
Figure 5:
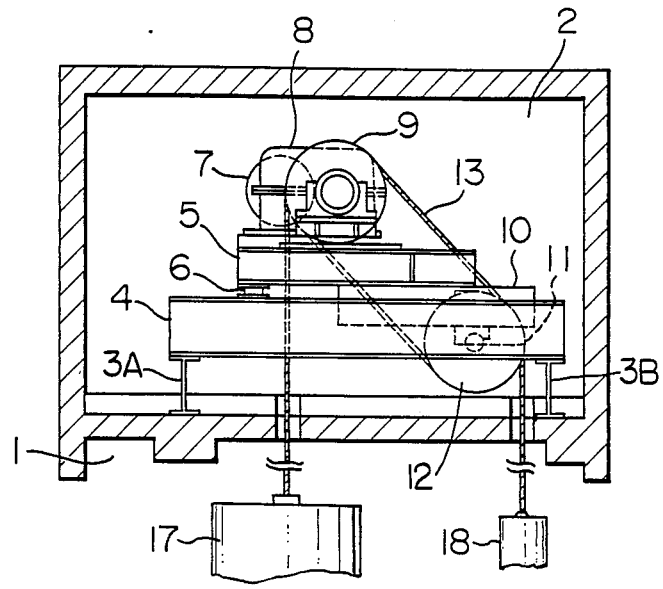
Figure 6:
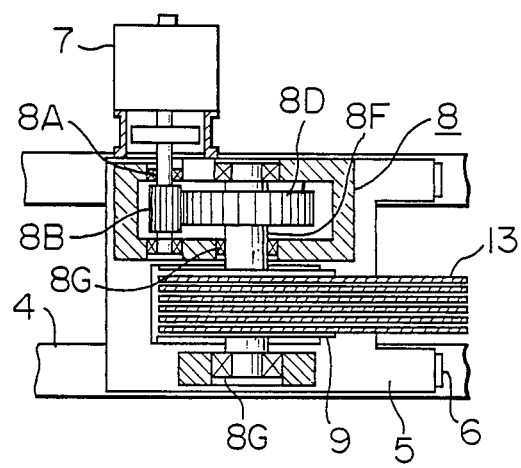

In addition, as shown in FIG. 4, the hoisting machine is fixed to the machine-room floor 2a by support frames 3a and 3b. If one of the support frames 3a and 3b is spaced apart from the center of the sheave 9 by a distance equivalent to the diameters of pulleys 16a and 16b respectively supporting the car and the counterweight, the support frame 3a functions as a support member for supporting one end of the main rope 13 in the 2:1 roping method.

In addition, before explaining how to improve the state of engagement of the gears, the generation and transmission of the noise of the helical gears will first be described below. In general, gears are arranged in such a manner that several pairs of teeth are brought into engagement one after another in order to transmit rotation. During this time, in the case of a typical helical gear, the number of simultaneously mating gears varies as the rotation proceeds. Since these teeth are resilient members, each pair of engaged teeth becomes a vibrating unit whose spring constant is periodically varied. Also, since the teeth cannot be produced so as to have ideal tooth profiles, a driven gear undergoes a forced displacement which may be caused mainly by the tooth profile error. Furthermore, since the point of engagement of typical helical gears shifts in the axial direction as well, the shafts of the gears serve as a beam subjected to a traveling load. In this fashion, in cases where power is transmitted through the helical gears, the shaft line of the helical gears is vibrated by a combination of three forced terms such as a coefficient excitation, a forced displacement and travel of a loading point. In response to this vibration, for example, the circumferential vibration of the sheave occurs or the sheave produces noise.

The noise will be described below in detail. In the case of a gear assembly, in particular of the type in which gears are enclosed in a gearbox, a noise emanates into the air from the engaged portion of the mating gears, passing through the gearbox and entering human ears. However, only 10% of the total noise merely reaches them, and the remaining 90% emanates outwardly when a fluctuating torque caused by the vibration of the shaft line of the aforesaid gears in the direction of its rotation is converted into a radially and axially fluctuating force. Therefore, in order to reduce the level of vibration noise of the helical gear assembly, the values of the aforementioned three terms must be reduced. In this case, the term of forced displacement cannot be reduced unless the accuracy of production of gears is enhanced. As described above, what directly affects the level of noise is the fluctuating load on a tooth surface which is obtained by multiplying the forced displacement and the spring constant of teeth together. It will be found, therefore, that, if the spring constant of teeth is reduced, he accuracy of production of gears need not necessarily be enhanced. On the other hand, in order to reduce the term of coefficient vibration, the contact ratio of the mating gears may be increased so as to reduce the range of fluctuation of the spring constant of teeth. In this case, it is preferred that the transverse contact ratio of various contact ratios is enhanced in terms of excitation effects based on the travel of a loading point. The spring constant of teeth can be calculated using a formula for obtaining the level of deflection of teeth which is described in "a collection of papers issued by Japan Mechanics Association, Vol. 15, No. 59".

The pressure angle and the height (or depth) of teeth were variously changed. The results will be described below with reference to FIGS. 7 to 10.

Figure 9:
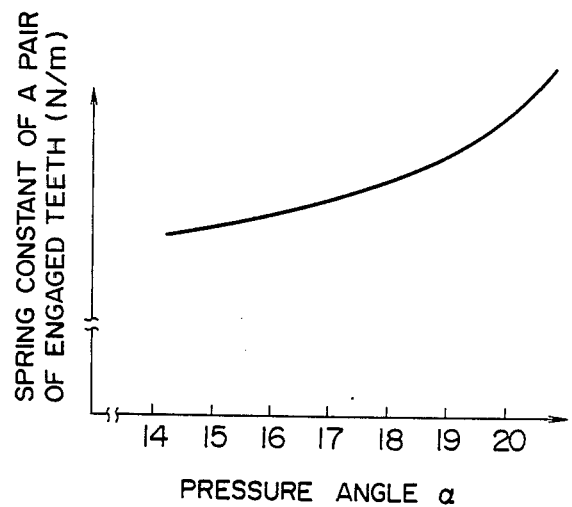
FIG. 9 is a chart showing the relationship between pressure angles and the spring constant of the teeth.

FIG. 9 shows variations in the spring constant of a pair of engaged teeth at a pitch (t) between normals when a pressure angle ($\alpha$) is changed in a case where an addendum (h1) and a deddendum (h2) except a root portion (or clearance) (c) are regarded as one module, that is, full-depth teeth.

Figure 10:
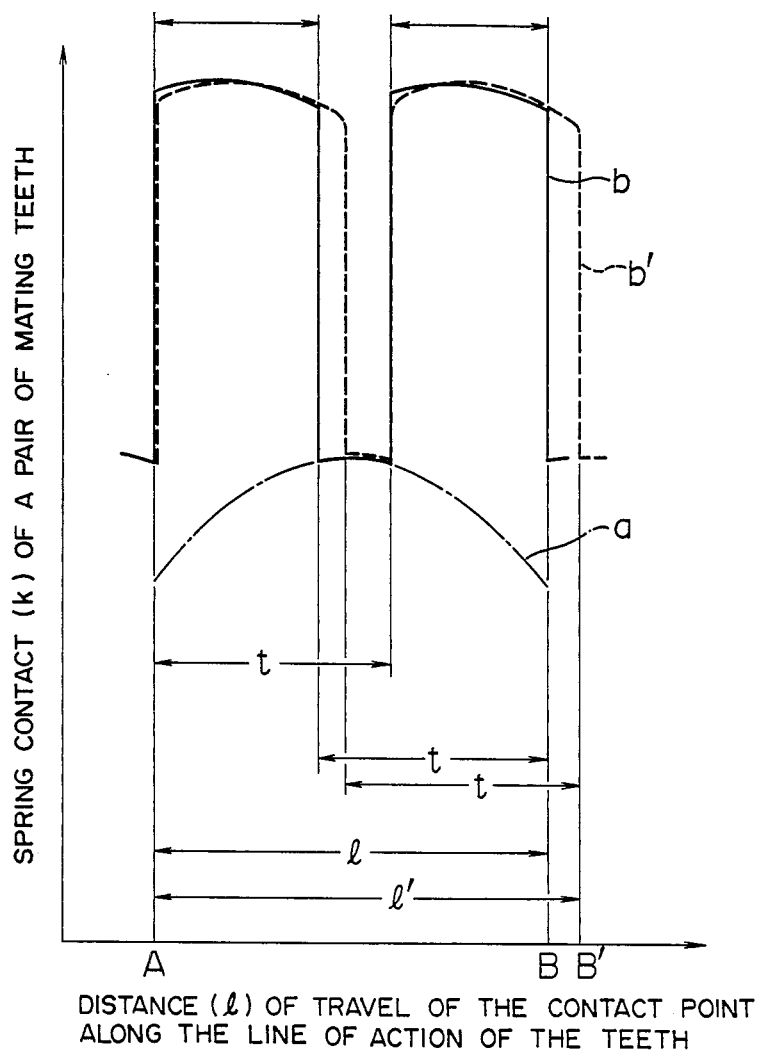
FIG. 10 is a chart showing variations in the spring constant of the teeth in contact as in a case where the engagement of the gears proceeds.

FIG. 10 shows variations in the spring constant (k) of a pair of mating teeth (curve (a)) and the variations of the pair of mating gears (curve (b)) obtained from the former variations while the engagement between the gears is proceeding, that is, the contact point is changing. In this case, the teeth have a JIS standard tooth profile in which the pressure angle ($\alpha$) is 20 degrees, the height (or depth) (h) of teeth being full-depth teeth. In FIG. 10, the length indicated by (l) represents the distance of travel of the contact point measured along the line of action of the teeth, (t) representing the pitch between adjacent normals. (l/t) represents the transverse contact ratio, in this example approximately 1.68. While the engagement is advancing from point (A) to point (B), the number of a pair of simultaneously engaged teeth varies in the manner of two pairs, one pair and two pairs. This causes abrupt variations in the spring constant (k) as shown. The broken line shown in FIG. 10 represents the result obtained from the calculation of the height (or depth) (h) of teeth when the addendum and deddendum are regarded as a 1.1 module. Since the height (h) is increased, the distance of travel of the contact point (between (A) and (b1)) is lengthened, i.e. (l'). Accordingly, variations in the spring constant (k) of teeth as between a two-pair engagement (curve (b')) and a one-pair engagement (curve (a)) are not so abrupt as that of an arrangement in which the height (h) is equivalent to one module.

Figure 7:
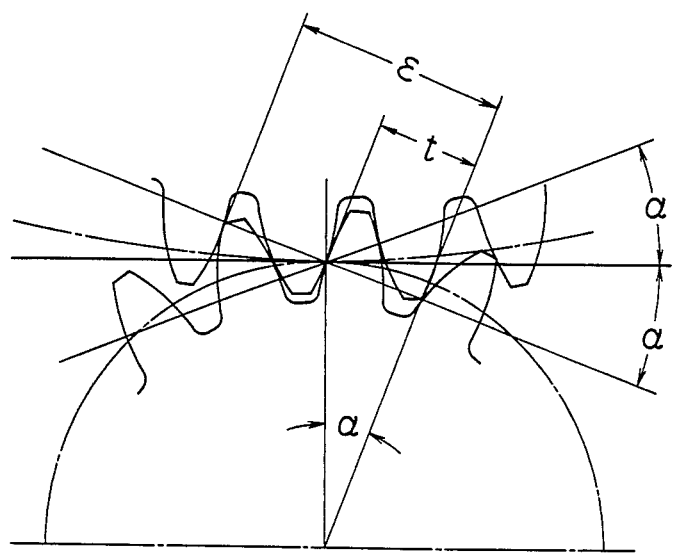
FIG. 7 is a schematic, cross-sectional view, taken in the direction perpendicular to the rotating axis of a pair of mating gears constituting the preferred embodiment of the present invention.

The gears incorporated in the reduction gear assembly 8, as shown in FIG. 7, each have a pressure angle ($\alpha$) of 17 degrees and a depth (h) equivalent to a 1.25 module.

Figure 8:
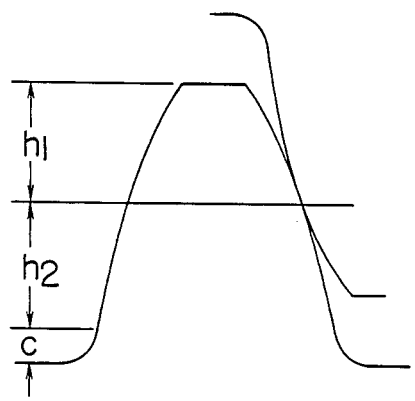
FIG. 8 is an enlarged view of a portion of the mating gears shown in FIG. 7 but showing a portion of teeth in engagement.

As is evident from FIGS. 8 to 10, if the value of the spring constant (k) of teeth and the degree of smoothness of its variations are merely considered, the smaller the pressure angle ($\alpha$), the better while the greater the height (h), the better. However, the pressure angle ($\alpha$) is limited in terms of the strength of teeth, and the height (h) of teeth is limited in terms of interference during the cutting of teeth and/or the operation of the elevator system.

Figure 11:
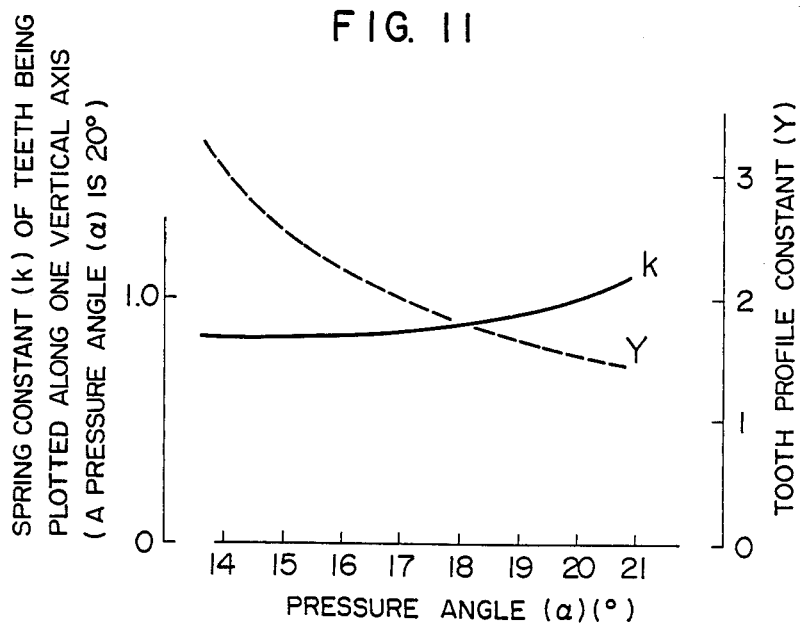
FIG. 11 is a chart showing variations in the spring constant of the teeth and the tooth-profile constant of the same in a case where the pressure angle varies.

FIG. 11 is a graph in which the pressure angle ($\alpha$) is plotted along the horizontal axis, the spring constant (k) of teeth being plotted along one vertical axis with reference to a pressure angle ($\alpha$) of 20 degrees and the tooth profile constant (Y) as the ratio of a deddendum stress and a tangential load per unit module and per unit face width being plotted along the other vertical axis. In FIG. 11, the spring constant (k) of teeth is shown in solid line while the tooth profile constant (Y) is shown in broken line. It is to be noted that the tooth profile constant (Y) cited in this specification is a so-called stress-tooth-profile constant, and thus as the value of this constant is increased, an increased level of stress is produced with respect to the same level of load. As can be seen from FIG. 11, when the pressure angle ($\alpha$) is in the range of 15 to 18 degrees, the level of stress does not excessively increase (for example, equal to or less than 1.7 times that generated at a pressure angle of 20 degrees) and yet the value of the spring constant (k) can be relatively reduced.

The interference between engaged teeth depends upon the selection of the number of teeth of gears, an addendum modification coefficient, and in addition the relation with the pressure angle ($\alpha$). Although it is therefore difficult to illustrate and depict such interference, calculation was made within the aforesaid range of pressure angles from 15 to 18 degrees under the condition that the number of teeth of the small gear is limited to a maximum of 35. It is preferred that this number is reduced since it determines a contact frequency constituting the basic frequency of the vibration noise of the teeth. It has been found from the result that a 1.35 module is the upper limit. In addition to the gear according to this embodiment having a pressure angle of 17 degrees and a height of 1.25 module, a conventional gear was prepared having the number of teeth, face width, helix angle and accuracy that are equal to those of the aforesaid embodiment, the conventional gear having been so formed as to have a pressure angle of 20 degrees and a full-depth teeth type (that is, the depth (or height) is 1 module.) The present embodiment and the conventional gear were incorporated in the same gearbox for the purposes of measuring the level of noise produced by the respective gears. In consequence, the result plotted in FIG. 12 was obtained.

Figure 12:
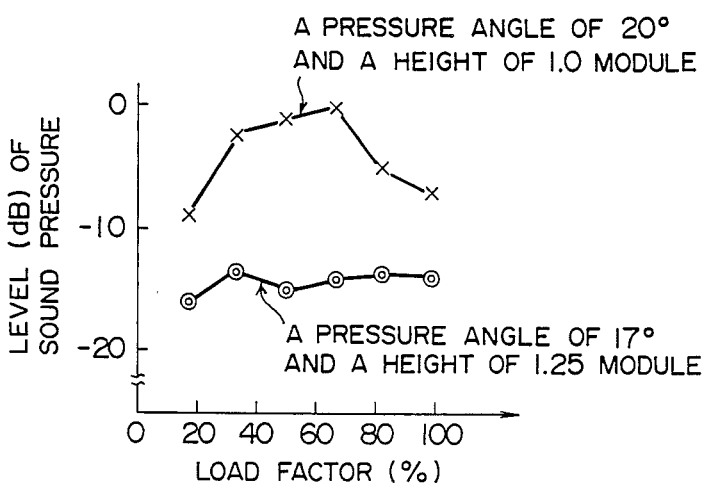
FIG. 12 is a chart showing the relationship between the noise and the load factor of the mating gears.

FIG. 12 shows variations in the level of sound pressure relating to a contact frequency component which is the fundamental frequency associated with a load factor. A line including symbols (O) corresponds to the presently preferred embodiment while another line including symbols (X) corresponds to the conventional gear. As is evident from FIG. 12, when the load factor is 30% or more, there is a difference of 10 to 14 dB between the two.

As will be readily understood from the foregoing description, in the elevator hoisting apparatus in accordance with the present invention, the reduction gear assembly including a pair of gears whose axes are parallel to each other is located in the substantial center, the electric motor and a pair of the sheave and the brake system being respectively disposed on the input shaft and output shaft of the reduction gear assembly. This arrangement enables a reduction in the size and weight of the apparatus and the compact layout of each of the components. Also, since the brake system is integral with the sheave, a burden applied to the gears is smaller than that applied to prior-art gears. Therefore, the present invention is superior in safety and reliability.

In addition, it is possible to reduce the levels of noise and vibration attributed to engagement of the gears of the elevator hoisting machine having a helical gear type reduction gear assembly without lowering the strength of the gears and providing disadvantages when the gears are produced. It is therefore possible to reduce the level of noise and vibration transmitted to the elevator cars and to a residential room in the vicinity of the uppermost floor of a building structure. In the consequence, the quantity of various measures for sound insulation can be reduced as compared with the prior art, and furthermore, if the conventional sound insulation measures are not modified, the level of noise and vibration can be further lowered, whereby it is possible to provide low-cost elevator hoisting apparatus featuring a silent operation.

What is claimed is:

1. An elevator hoisting apparatus having a reduction gear assembly connected to a driving electric motor and a sheave, a main rope being reeved around said sheave for supporting a car in a suspended manner so that said car may be moved upwardly and downwardly, said reduction gear assembly including a pair of meshing large and small gears connected respectively to an input shaft of said reduction gear assembly, said input shaft and said output shaft having parallel axes, said driving electric motor being operatively associated with said input shaft at one side of said reduction gear assembly, said sheave and a brake system being operatively associated with said output shaft at an opposite side of said reduction gear assembly, one bearing of said sheave being integral with a gearbox of said reduction gear assembly, and said large gear being supported in a cantilever manner by only the output shaft.

2. An elevator hoisting apparatus according to claim 1, wherein said brake system such includes a drum integral with said sheave and held between brake elements supported by a bearing in such a manner that the brake system encloses a portion of said sheave.

3. An elevator hoisting apparatus having a driving electric motor and a reduction gear assembly connected to a sheave in which a main rope is reeved around said sheave for supporting a car in a suspended manner so that said car may be moved upwardly and downwardly, said reduction gear assembly including a pair of meshing large and small helical gears, and said helical gears having a pressure angle ($\alpha$) defined by the angle between the common normal to profiles at a contact point between said gears and a common pitch plane of said gear of 15 to 18 degrees and being connected respectively to an input shaft and an output shaft of said reduction gear assembly, said input shaft and said output shaft having parallel axes, said driving electrical motor being operatively associated with said input shaft, and said sheave and a brake system being operatively associated with said output shaft.

4. An elevator hoisting apparatus according to claim 3, wherein said helical gears have a deddendum of 1.1 to 1.3 module which is the value obtained by subtracting an addendum and a root from a depth of teeth.

5. An elevator hoisting apparatus having a reduction gear assembly connected to a driving electric motor and a sheave, a main rope being reeved around said sheave for supporting a car in a suspended manner so that said car may be moved upwardly and downwardly, said reduction gear assembly including a pair of meshing small and large helical gears connected respectively to an input shaft and an output shaft of said reduction gear assembly, said input shaft and said output shaft having parallel axes, said driving electrical motor being operatively associated with said input shaft, said sheave and a brake system being operatively associated with said output shaft, one bearing of said sheave being integral with a gearbox of said reduction gear assembly, and said large helical gear being supported in a cantilever manner by only the output shaft, and said helical gears have a pressure angle (α) defined by the angle between the common normal to profiles at a point between said gears and a common pitch plane of said gear of 15 to 18 degrees.

6. An elevator hoisting apparatus according to claim 5, wherein said helical gears have a deddendum of 1.1 to 1.3 module which is the value obtained by subtracting an addendum and a root from a depth of a tooth.

* * * * *